(12) United States Patent
Wu et al.

(10) Patent No.: US 10,552,499 B2
(45) Date of Patent: Feb. 4, 2020

(54) LANDMARK RECOMMENDATION METHOD AND NON-TRANSITORY COMPUTER-READABLE STORAGE MEDIUM INTEGRATED WITH LIFE BEHAVIOR ANALYSIS AND SOCIAL NETWORK

(71) Applicant: Chunghwa Telecom Co., Ltd., Yangmei, Taoyuan County (TW)

(72) Inventors: Kuo-Ruey Wu, Yangmei (TW); Wen-Hsuan Hung, Yangmei (TW)

(73) Assignee: Chunghwa Telecom Co., Ltd., Yangmei (TW)

( * ) Notice: Subject to any disclaimer, the term of this patent is extended or adjusted under 35 U.S.C. 154(b) by 535 days.

(21) Appl. No.: 15/364,637

(22) Filed: Nov. 30, 2016

(65) Prior Publication Data
US 2018/0018395 A1    Jan. 18, 2018

(30) Foreign Application Priority Data
Jul. 15, 2016 (TW) .............................. 105122340 A

(51) Int. Cl.
*G06F 16/00* (2019.01)
*G06F 16/9535* (2019.01)
*G06F 16/29* (2019.01)

(52) U.S. Cl.
CPC .......... *G06F 16/9535* (2019.01); *G06F 16/29* (2019.01)

(58) Field of Classification Search
CPC .............................. G06F 16/29; G06F 16/9535
See application file for complete search history.

(56) References Cited

U.S. PATENT DOCUMENTS

| | | | | |
|---|---|---|---|---|
| 9,820,094 | B2 * | 11/2017 | Zhang | G06F 16/9535 |
| 10,135,931 | B2 * | 11/2018 | Tseng | H04W 4/21 |
| 2013/0345961 | A1 * | 12/2013 | Leader | G01C 21/20 701/410 |
| 2014/0101275 | A1 * | 4/2014 | Garcia | G06Q 10/00 709/206 |
| 2015/0178284 | A1 * | 6/2015 | Garg | H04L 67/10 707/748 |

FOREIGN PATENT DOCUMENTS

CN       1751320        3/2006

* cited by examiner

*Primary Examiner* — Cheryl Lewis
(74) *Attorney, Agent, or Firm* — Amin, Turocy & Watson, LLP

(57) ABSTRACT

A landmark recommendation method and non-transitory computer-readable storage medium integrated with life behavior analysis and social network. The aforementioned method analyzes device time information and device location information of a user device operated by a user so as to provide life behavior information related to the user, analyzes the life behavior information so as to provide a user preference value, weights a plurality of landmarks located in an inquiring landmark area according to the user preference value and a social recommendation value, and then selects a recommendation list from the landmark which meets a threshold value.

10 Claims, 3 Drawing Sheets

LANDMARK RECOMMENDATION METHOD AND NON-TRANSITORY COMPUTER-READABLE STORAGE MEDIUM INTEGRATED WITH LIFE BEHAVIOR ANALYSIS AND SOCIAL NETWORK

BACKGROUND OF THE INVENTION

This application claims priority of Application No. 105122340 filed in Taiwan, R.O.C. on Jul. 15, 2016 under 35 U.S.C. § 119, the entire contents of which are hereby incorporated by reference.

1. Field of the Invention

The invention relates to a landmark recommendation method and its computer program product. In particular, it relates to a landmark recommendation method and its computer program product that integrate the life behavior analysis and social network.

2. Brief Description of the Prior Art

When choosing landmarks such as restaurants or tourist attractions in real life, many users tend to search the internet for landmarks in a specific area, and use the recommended articles on the internet as a reference to consider visiting the landmark. For example, when users wish to select a restaurant near the railway station, they will key in "restaurant railway station" in the search engine, and then browse through the blog articles published on the internet, article by article, to find and select a restaurant that meets their expectations.

Using the aforementioned method to search and browse will take up considerable time. When there are multiple landmarks in the specific region, the users will need to spend massive amounts of time, thus causing inconvenience to the users. In addition, the current landmark recommendation technology in prior art is unable to recommend landmarks that fulfill the needs of the users based on the users' habits, so users have to use manual methods to filter out the landmarks that do not conform to their needs.

Based on the above, finding a technological solution that can integrate life behavior and social network recommendation to provide landmark recommendation is a technological challenge that needs to be solved in this sector.

SUMMARY OF THE INVENTION

In order to solve the aforementioned issue, the aim of the invention is to provide a technical means that can analyze user life behavior and habits, as well as social network recommendations to offer landmark recommendation.

In order to achieve the above-noted aim, the invention proposes a landmark recommendation solution that integrates life behavior analysis and social network. The landmark recommendation solution is applied in a server computer device and comprises the following procedures. Firstly, the device time information and device location information of a user is analyzed to provide life behavior information of the corresponding user. The life behavior information comprises one or a plurality of time grouping blocks and location grouping information. Next, the life behavior information is analyzed to provide user preference. Based on the user preference and social network recommendation values, the information of the multiple landmarks in the queried region is subject to weighted processing to generate a recommendation list from the landmark information that conforms to the threshold value, after which the recommendation list is then transmitted to the user device.

To achieve the above aim, the invention also proposes a form of landmark recommendation computer program product that integrates user life behavior analysis and social network. When the computer device loads and executes the computer program product, the device may complete the procedures for the aforementioned landmark recommendation method.

To achieve the aim, the invention also proposes a form of landmark recommendation method that integrates user life behavior analysis and social network recommendations. The method may be applied in mobile communication devices and comprises the following steps. Firstly, the device time information and device location information of the mobile communication device on the user end is analyzed to provide life behavior information of the corresponding user. The life behavior information comprises of one or a plurality of time grouping blocks and location grouping information. Next, the life behavior information is analyzed to provide user preference. Based on the user preference and social network recommendation values, the information of the multiple landmarks in the queried region is subject to weighted processing to generate a recommendation list from the landmark information that conforms to the threshold value, after which the recommendation list is presented on the display unit of the mobile communication device.

To achieve the aim, the invention also proposes a form of landmark recommendation computer program product that integrates user life behavior analysis and social network. When the mobile communication device loads and executes the computer program product, the device may complete the procedures for the aforementioned landmark recommendation method.

Based on the above, the integration of life behavior analysis and social network recommendation in the landmark recommendation method and its computer program product in the invention will analyze user life behavior and social recommendation values to generate a recommendation list that conforms to the requirements of the user from the multitude of landmarks.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENT

The following description is about embodiments of the present invention; however it is not intended to limit the scope of the present invention.

Figure 1:
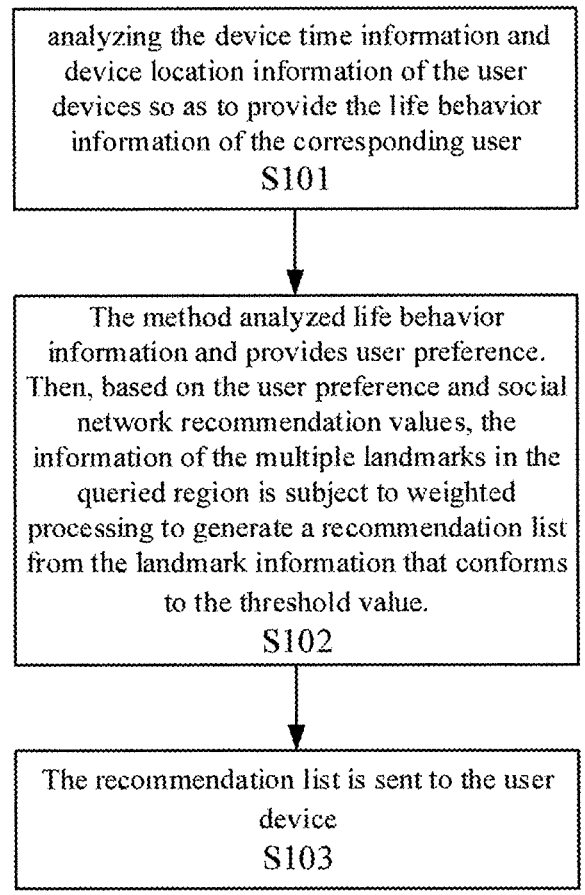
FIG. 1 is the procedure flowchart of the first embodiment of the landmark recommendation method in the invention, featuring integration of life behavior analysis and social network recommendation.

Please refer to FIG. 1, which is the procedure flowchart of the first embodiment of the invention, relating to a landmark recommendation method featuring integration of life behavior analysis and social network recommendation. The aforementioned method can be applied in a server computer device, and the procedures are described as follows:

S101: Communication is established to connect one or a plurality of user end devices to analyze the device time information and device location information of the user devices so as to provide the life behavior information of the corresponding user. The life behavior information comprises one or a plurality of time grouping blocks and location grouping information.

S102: The life behavior information is analyzed to provide user preference. Based on the user preference and social network recommendation values, the information of the multiple landmarks in the queried region is subject to weighted processing to generate a recommendation list from the landmark information that conforms to the threshold value.

S103: The recommendation list is sent to the user device.

The aforementioned method makes further use of the location relation value for the weighted processing of the landmark information in the queried region to generate a recommendation list from the landmark information that conforms to the threshold value. The aforementioned location relation value is generated based on the number of times the device location information is situated in the target information within a specific period of time.

The aforementioned social network recommendation value is generated based on the tagging frequency of the landmark by one or multiple user ends in the social network (such as the tagging or check-in function on Facebook™). In another embodiment, the aforementioned social network recommendation value is generated based on the comments on the landmark by one or multiple user ends in the social network, such as conducting Text Mining or keyword comparison on the comments so as to gather information regarding the positive or negative nature of the landmark comments.

The invention also provides a second embodiment which is a landmark recommendation computer program product that integrates user life behavior analysis and social network. When the computer device loads and executes the computer program, the device may complete the aforementioned procedures of the first embodiment.

Figure 2:
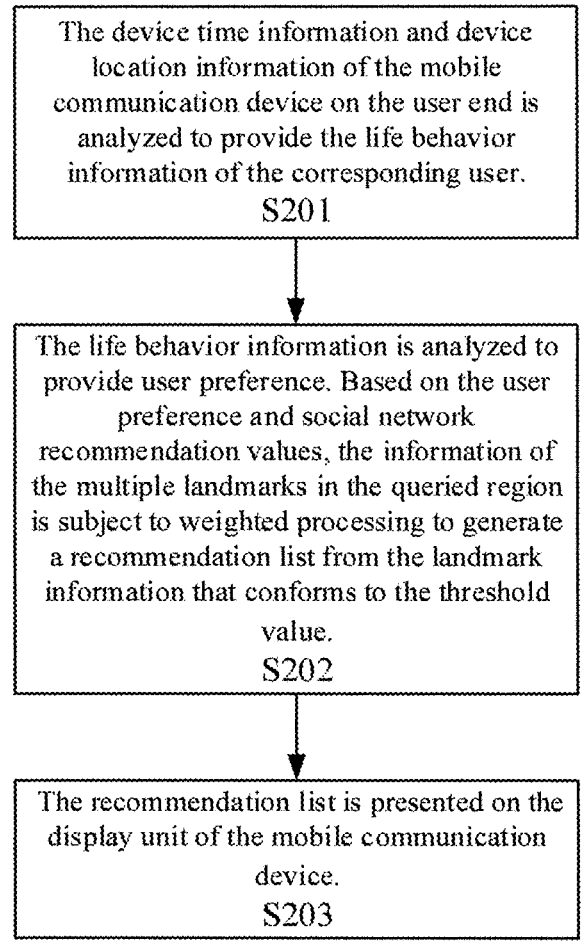
FIG. 2 is the procedure flowchart of the third embodiment of the landmark recommendation method in the invention, featuring integration of life behavior analysis and social network recommendation.

Please refer to FIG. 2, which is the procedure flowchart of the third embodiment of the invention relating to a landmark recommendation method, featuring integration of life behavior analysis and social network recommendation. The third embodiment is similar to the first embodiment. However, a difference lies in that the third embodiment is applied and executed by mobile communication devices (such as smart phones, tablets, and mobile internet devices). The procedures of the method are described as follows:

S201: The device time information and device location information of the mobile communication device on the user end is analyzed to provide the life behavior information of the corresponding user. The life behavior information comprises one or a plurality of time grouping blocks and location grouping information.

S202: The life behavior information is analyzed to provide user preference. Based on the user preference and social network recommendation values, the information of the multiple landmarks in the queried region is subject to weighted processing to generate a recommendation list from the landmark information that conforms to the threshold value.

S203: The recommendation list is presented on the display unit of the mobile communication device.

The aforementioned method makes further use of the location relation value for the weighted processing of the landmark information in the queried region to generate a recommendation list from the landmark information that conforms to the threshold value. The aforementioned location relation value is generated based on the number of times the device location information is situated in the target information within a specific period of time.

The invention also provides a fourth embodiment which relates to a landmark recommendation computer program product that integrates user life behavior analysis and social network. When the mobile communication device loads and executes the aforementioned computer program product, the device may complete the aforementioned procedures for the third embodiment method.

The aforementioned computer program product and method may be written using programming languages such as ASP, C/C++/C #, JAVA, Python, PHP, and Perl, but not restricted to these programming language types.

Figure 3:
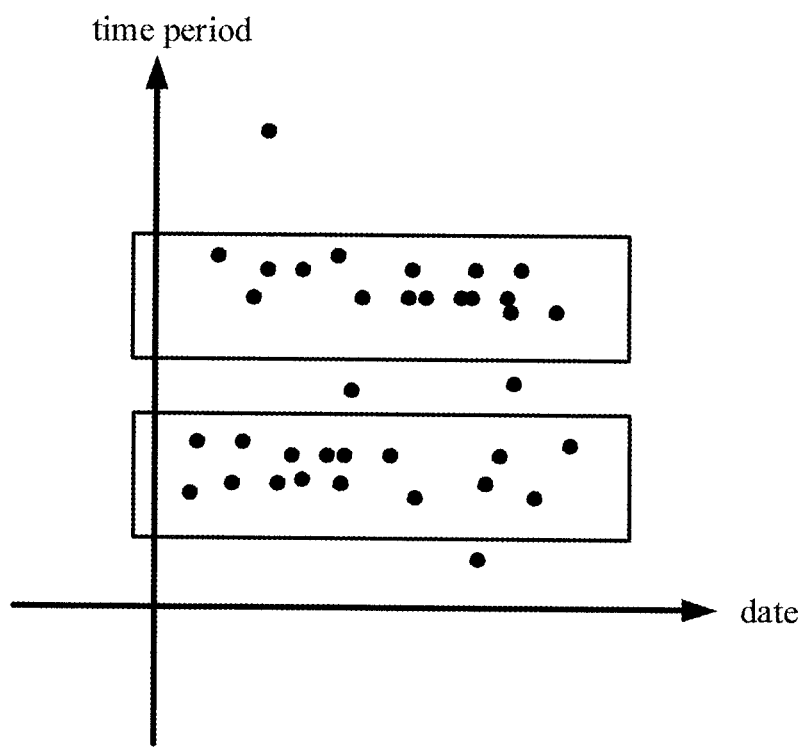
FIG. 3 is the distribution chart of the user life behavior in the invention.

To further specify the technical features of the invention, the invention will clarify using the first embodiment as example, but similar technical performances may also be achieved in the second to fourth embodiments. After the server computer device is connected to external user devices (such as smart phones and tablets) through communication connections, the server computer device may obtain the device time information (such as length of operation time) and device location information (such as GPS coordinate information). The life behavior information in the invention is classified into time grouping clusters (such as daily, weekly, monthly, and annually) to differentiate the use life behavior into one or a plurality of time grouping blocks (FIG. 3) so as to identify the user behavior set. The location grouping blocks comprises the grouping set of the range of coordinates and administrative zone set. The aforementioned user behavior set is comprised of time grouping blocks and location grouping blocks which are then classified into time and location dependent sets, time dependent sets, location dependent sets, and other sets that are not dependent on time and location. The behaviors of the various sets comprise of landmark types and the queried or recommended criteria when selecting the landmark so as generate unique life behavior and landmark requirements of the user.

When the user is searching in a specific landmark area, the server computer device will conduct weighted analysis on the multiple landmark information in the landmark region, and generate a recommendation list that has one or a plurality of landmark information. The formula for the weighted value is as shown:

$$\text{Weighted Value}_i = \lambda_{like} \times f_{like_i} + \lambda_{social} \times f_{social_i} + \lambda_{geo} \times f_{geo_i} \times \lambda_\varepsilon \qquad \text{eq}(1)$$

The aforementioned weighted value; represents weighted value of the $i^{th}$ landmark information in the landmark set, $f_{social_i}$ represents the social network recommendation, $f_{like_i}$ represents the user preference, and $f_{geo_i}$ represents the location relation value. The optimal weight is obtained by finding the values for $\lambda_{like}$, $\lambda_{social}$, $\lambda_{geo}$, and $\lambda_\varepsilon$ (default value) so as to allow the results of the recommendation list to conform to the requirements of the user. In the first embodiment, the server computer uses linear regression analysis to analyze the multiple life behavior records of the user to calculate the aforementioned λ value.

To further clarify, if the time criteria for the life analysis is four groups of t_day/Day, t_week/Week, t_mont/Month, and t_year/Year, and set as t_day=1 hour, t_week=4 hour, t_mont=8 hour, and t_year=24 hour, or 1 hour per day, 4 hours per week, 8 hours per month and 24 hours per year respectively. Taking the daily time criteria for example, the Day$_1$~Day$_n$ information is analyzed and the formula of $$\frac{fd_1 + fd_2 + \ldots + fd_n}{fd_{total}} > f_\varepsilon$$

is calculated, in which the $fd_{i, i \in 1 \ldots n}$ is the number of times executed by the user in the $t_{day}$ period on Day$_i$, $fd_{total}$ is the total number of times executed, and $f_\varepsilon$ is the predefined average lower limit of executions. The analysis model for weekly, monthly, and annually data is the same.

Next, in terms of location criteria, the invention defines a 1 km radius around the coordinates as the first location criteria, and the smallest township/city as the second location criteria. After using the time and location criteria to group the user information, the time and location dependent set may be obtained and comprises of eight sets of, t_day/Day and range of coordinates, t_week/Week and range of coordinates, t_month/Month and range of coordinates, t_year/Year and range of coordinates, t_day/Day and township/city, t_week/Week and township/city, t_month/Month and township/city, and t_year/Year and township/city.

The time dependent set comprises of four sets of, t_day/Day, t_week/Week, t_month/Month, and t_year/Year. The location dependent set comprises of range of coordinates set, administrative zone set, and the remaining sets that are neither time nor location dependent. In a better embodiment, through the analysis and calculation of the information of user A over the past month, results showed that in the past month, the number of times the user searched for a restaurant within 1 km radius of the coordinate [953734, 121.166354] between 23:00~24:00 every day accounted for more than 25% of the total number of searches in the month, thus deriving the t_day/Day and range of coordinates set of the search for restaurant within 1 km radius of the coordinate [953734, 121.166354] between 23:00~24:00 every day as the life behavior.

Next, through the optimization of the variables in the weighted formula, a landmark recommendation list; is generated when user A searches for a restaurant. Every landmark in the recommendation list comprises of a weighted value and calculation formula. When user A selects a particular landmark, and defines the largest weighted value in the list as the calculation value, and assigns $\lambda_{like}$, $\lambda_{social}$, $\lambda_{geo}$, and $\lambda_\varepsilon$ as variables, the largest weighted value in list_i=$\lambda_{like} \times 0.3 + \lambda_{social} \times 0.2 + \lambda_{geo} \times 0.5 + \lambda_\varepsilon$ may be obtained. Through the analysis of the provided past month information, an n number of records will yield n number of formulas, and the linear regression method may be used to calculate the optimized values of $\lambda_{like}$, $\lambda_{social}$, $\lambda_{geo}$, and $\lambda_\varepsilon$.

When user A initiates the service at the coordinate [24.953729, 121.166358] at 23:32, the service will identify the life behavior of searching for nearby restaurants in the t_day/Day and range of coordinates set according to the time and location. At this time, the program will automatically search the database and generate a preliminary list for n landmark records. Each landmark record i comprises of the degree of preference$like_i$, grade of recommendation $S_j P_i$ from social network $S_{j, j \in 1 \ldots m}$, and the current location of the user device geo$_i$. The method will calculate the user preference $$f_{like_i} = \frac{like_i}{\max_{k \in 1 \ldots n} like_k}$$

in the list of n records, the social network recommendation value $f_{social_i} = \lambda_{S1} * f_{S_1 P_i} + \ldots + \lambda_{sm} * f_{S_m P_i}$, in which the $\lambda_{sj, j \in 1 \ldots m}$ is predefined weight of social network $$S_{j, j \in 1 \ldots m}, f_{S_j P_i} = \frac{S_j P_k}{\max_{k \in 1 \ldots n} S_j P_k}$$

is the social network recommendation value of social network $S_j$, and $$f_{geo_i} = \frac{geo_i}{\max_{k \in 1 \ldots n} geo_k}$$

is the location relation value. Using the optimized variables to calculate the weighted value, the weighted value$_i = \lambda_{like} * f_{like_i} + \lambda_{social} * f_{social_i} + \lambda_{geo} * f_{geo_i} + \lambda_\varepsilon$. Through the arrangement of calculated values of the n records in descending order, landmarks that are redundant or below threshold value are eliminated to generate the final recommendation list.

To further explain, if the usage record of user A in a particular week is as shown in Table 1:

TABLE 1

| Usage Time of A | Usage Location of A | Location of Search Query | Type of Search Query | Number of Search Queries |
| --- | --- | --- | --- | --- |
| Monday: 11:00-11:20 | Zhongli Station | 1 km radius in the vicinity | Food Take-out Store | 3 |
| Monday: 18:34 | Pingzhen | Taoyuan City | Apparel Store | 1 |
| Tuesday: 10:30-10:45 | Zhongli Station | 1 km radius in the vicinity | Fast Food Store | 2 |
| Wednesday: 10:40-10:50 | Zhongli Station | 1 km radius in the vicinity | Food Take-out Store | 3 |
| Thursday: 11:10-11:25 | Zhongli Station | 1 km radius in the vicinity | Noodle Store | 2 |
| Thursday: 19:32 | Pingzhen | Pingzhen District | Basketball Court | 1 |
| Friday: 11:10-11:25 | Zhongli Station | 1 km radius in the vicinity | Fast Food Store | 2 |
| Saturday: 20:22 | Pingzhen | Zhongli District | Bar | 1 |

The time criteria for the life behavior analysis is set as daily analysis, and t_day/Day is calibrated as 1 hour, $f_\varepsilon$ as 30%, location criteria as the landmark, and for a total of 15 times, the time dependent formula will be $$\frac{fd_1 + fd_2 + \ldots + fd_n}{fd_{total}}.$$

From here, it may be calculated that the value for the period of 10:30-11:30 is 12/15>30% while the location dependent variable for Zhongli Station is 12/15>30%, thus forming the life behavior of "Searching for Food Take-out, Fast Food, and Noodle Stores Within a 1 km Radius from Zhongli Station between 10:30-11:30".

In a better embodiment, the formula for the weighted value of the life behavior of "Searching for Food Take-out, Fast Food, and Noodle Stores Within a 1 km Radius from Zhongli Station between 10:30-11:30" is as follows, Weighted Value$_i = \lambda_{like} * f_{like_i} + \lambda_{social} * f_{social_i} + \lambda_{geo} * f_{geo_i} + \lambda_\varepsilon$. In Table 2, the value beside the stores is the weighted value while the three fields below are user preference $f_{like_i}$, social network recommendation $f_{social_i}$, and location relation value $f_{geo_i}$ respectively. The calculation of each value is based on the obtaining of the user preference, social network resources interface, distance between user location and stores and normalizing to 0~1 values.

From the current weighted formula is $=f_{like_i} \times 0.3 + f_{social_i} \times 0.5 + f_{geo_i} \times 0.2 + 0.2$, the first four selection results for the recommendation list of the life behaviors is as follows:

TABLE 2

| Selection B | Food Take-out Store A 0.75 | | | Food Take-out Store B 0.93 | | | Food Take-out Store C 0.55 | | |
|---|---|---|---|---|---|---|---|---|---|
| | 0.8 | 0.3 | 0.8 | 0.5 | 0.8 | 0.9 | 0.2 | 0.3 | 0.7 |
| Selection A | Fast Food Store A 0.86 | | | Fast Food Store B 0.89 | | | Fast Food Store C 0.65 | | |
| | 0.6 | 0.6 | 0.9 | 0.5 | 0.8 | 0.7 | 0.4 | 0.3 | 0.9 |
| Selection B | Noodle Store A 0.64 | | | Noodle Store B 0.79 | | | Noodle Store C 0.86 | | |
| | 0.7 | 0.1 | 0.9 | 0.6 | 0.7 | 0.3 | 0.8 | 0.6 | 0.6 |
| Selection B | Fast Food Store A 0.75 | | | Fast Food Store B 0.85 | | | Fast Food Store C 0.92 | | |
| | 0.9 | 0.2 | 0.9 | 0.8 | 0.5 | 0.8 | 0.7 | 0.7 | 0.8 |

Using $\lambda_{like}$, $\lambda_{social}$, $\lambda_{geo}$, and $\lambda_\varepsilon$ as variables, and $f_{like_i}$, $f_{social_i}$, and $f_{geo_i}$ of store selection as parameters, the values are assigned the maximum values in weighted calculations to obtain the four following formulas:

Selection B $\quad 0.93 = 0.5 \times \lambda_{like} + 0.8 \times \lambda_{social} + 0.9 \times \lambda_{geo} + \lambda_\varepsilon$
Selection A $\quad 0.89 = 0.6 \times \lambda_{like} + 0.6 \times \lambda_{social} + 0.9 \times \lambda_{geo} + \lambda_\varepsilon$
Selection B $\quad 0.86 = 0.6 \times \lambda_{like} + 0.7 \times \lambda_{social} + 0.3 \times \lambda_{geo} + \lambda_\varepsilon$
Selection B $\quad 0.92 = 0.8 \times \lambda_{like} + 0.5 \times \lambda_{social} + 0.8 \times \lambda_{geo} + \lambda_\varepsilon$ Next, using regression algorithm to solve the formula, linear regression can be used in this embodiment to obtain:

$$X = \begin{bmatrix} 0.5 & 0.8 & 0.9 & 1 \\ 0.6 & 0.6 & 0.9 & 1 \\ 0.6 & 0.7 & 0.3 & 1 \\ 0.8 & 0.5 & 0.8 & 1 \end{bmatrix}, \beta = \begin{bmatrix} \lambda_{like} \\ \lambda_{social} \\ \lambda_{geo} \\ \lambda_\varepsilon \end{bmatrix}, Y = X\beta = \begin{bmatrix} 0.93 \\ 0.89 \\ 0.86 \\ 0.92 \end{bmatrix}$$

$$\text{Solve } \beta = \begin{bmatrix} \lambda_{like} \\ \lambda_{social} \\ \lambda_{geo} \\ \lambda_\varepsilon \end{bmatrix} = (X^T X)^{-1} X^T Y$$

$$\text{To obtain} \begin{bmatrix} \lambda_{like} \\ \lambda_{social} \\ \lambda_{geo} \\ \lambda_\varepsilon \end{bmatrix} \cong \begin{bmatrix} 0.4 \\ 0.4 \\ 0.1 \\ 0.3 \end{bmatrix}$$

Revised Weighted Formula$=f_{like_i} \times 0.4 + f_{social_i} \times 0.4 + f_{geo_i} \times 0.1 + 0.3$ As such, when user A is located in Zhongli Station between 10:30-11:30, and the user life behavior conforms to the behavior of "Searching for Food Take-out, Fast Food, and Noodle Stores Within a 1 km Radius from Zhongli Station between 10:30-11:30", the program will automatically execute a search result on the life behavior of the user and use the weighted formula$=f_{like_i} \times 0.4 + f_{social_i} \times 0.4 + f_{geo_i} \times 0.1 + 0.3$ to calculate the weights and generate a recommendation list in descending order.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A landmark recommendation method integrated with life behavior analysis and social network applied in a server computer device, comprising:
   analyzing device time information and device location information of a user device operated by a user so as to provide life behavior information related to the user, wherein the life behavior information comprises one or a plurality of time grouping block and location grouping information;
   analyzing the life behavior information so as to provide a user preference, and weighting a plurality of landmarks located in an inquiring landmark area according to the user preference and a social recommendation value so as to provide weighted values of the landmarks, and then selecting a recommendation list from the weighted values of the landmarks which meets a threshold value; and
   transmitting the recommendation list to the user device.

2. The method as claimed in claim 1, further weighting the landmark located in the inquiring landmark area according to a location relation value, and selecting the recommendation list from the landmark which meets the threshold value.

3. The method as claimed in claim 2, wherein the location relation value is generated by number of times of the device location information located in the landmark in a specific time period of the user.

4. The method as claimed in claim 1, wherein the social recommendation value is generated by tagging frequency of the landmark by one or a plurality of user end.

5. The method as claimed in claim 1, wherein the social recommendation value is generated by recommendation content of the landmark by one or a plurality of user end.

6. A non-transitory computer-readable storage medium having instructions stored therein, which when executed by a computer, cause the computer to perform a method for executing computer program code, the method comprising:
   analyzing device time information and device location information of a user device operated by a user so as to provide life behavior information related to the user, wherein the life behavior information comprises one or a plurality of time grouping block and location grouping information;

analyzing the life behavior information so as to provide a user preference, and weighting a plurality of landmarks located in an inquiring landmark area according to the user preference and a social recommendation value so as to provide weighted values of the landmarks, and then selecting a recommendation list from the weighted values of the landmarks which meets a threshold value; and transmitting the recommendation list to the user device.

7. A landmark recommendation method integrated with life behavior analysis and social network applied in a mobile communication device, comprising:

analyzing device time information and device location information of the mobile communication device operated by a user so as to provide life behavior information related to the user, wherein the life behavior information comprises one or a plurality of time grouping block and location grouping information;

analyzing the life behavior information so as to provide a user preference, and weighting a plurality of landmarks located in an inquiring landmark area according to the user preference and a social recommendation value so as to provide weighted values of the landmarks, and then selecting a recommendation list from the weighted values of the landmarks which meets a threshold value; and displaying the recommendation list on a displayer of the mobile communication device.

8. The method as claimed in claim 7, further weighting the landmark located in the inquiring landmark area according to a location relation value, and selecting the recommendation list from the landmark which meets a threshold value.

9. The method as claimed in claim 8, wherein the location relation value is generated by number of times of the device location information located in the landmark in a specific time period of the user.

10. A non-transitory computer-readable storage medium having instructions stored therein, which when executed by a mobile communication device, cause the mobile communication device to perform a method for executing computer program code, the method comprising:

analyzing device time information and device location information of the mobile communication device operated by a user so as to provide life behavior information related to the user, wherein the life behavior information comprises one or a plurality of time grouping block and location grouping information;

analyzing the life behavior information so as to provide a user preference, and weighting a plurality of landmarks located in an inquiring landmark area according to the user preference and a social recommendation value so as to provide weighted values of the landmarks, and then selecting a recommendation list from the weighted values of the landmarks which meets a threshold value; and displaying the recommendation list on a displayer of the mobile communication device.

* * * * *